UNITED STATES PATENT OFFICE.

ERNEST H. SANITER, OF WIGAN, ENGLAND.

PROCESS OF PURIFYING IRON OR STEEL.

SPECIFICATION forming part of Letters Patent No. 571,538, dated November 17, 1896.

Original application filed February 24, 1892, Serial No. 422,662. Divided and this application filed June 22, 1892. Serial No. 437,577. (No specimens.) Patented in Belgium January 2, 1892, No. 98,005.

*To all whom it may concern:*

Be it known that I, ERNEST HENRY SANITER, a subject of the Queen of Great Britain, residing at Wigan, in the county of Lancaster, England, have invented certain new and useful Improvements in the Purification of Iron or Steel, (patented in Belgium, No. 98,005, dated January 2, 1892,) of which the following is a specification.

This application is a division of an application, Serial No. 422,662, filed by me February 24, 1892, and no claim is intended to be made herein to the matters therein embraced.

In the manufacture of steel by the basic Bessemer process it has been suggested to add chlorid of calcium or other halogen salts of lime with lime to assist the dephosphorization by promoting the fluidity of the slag. In all these cases, however, the slag has consisted of from thirty-five to forty-five per cent. lime. Now I have found that with these fluid slags containing not more than forty-five per cent. of lime it is quite impossible to extract the sulfur, and I believe there is no instance on record of the percentage of sulfur being reduced by this means. I have found, however, that if the slags be kept so basic as to contain fifty-five to sixty per cent. of alkaline earth, in which state it is in a very thick viscous condition, the addition of chlorid or of a fluorid or other halogen salt of an alkaline earth has the property of causing the sulfur to leave the iron and join the slag.

This invention has for its object the purification of iron from sulfur during its conversion into steel or homogeneous metal.

The process consists in bringing into contact with the molten iron or steel a halogen salt of an alkaline-earth metal, together with an alkaline-earth-metal oxid, carbonate, or hydrate, under the conditions to be hereinafter described, for the purpose of removing sulfur.

In working the process I do not confine myself to the use of a ready-formed chlorid or other halogen salt of an alkaline-earth metal. A mixture of materials may be used to form the chlorid in the vessels or furnaces, such, for instance, as chlorid of iron (refuse from galvanizing works) and lime.

In carrying out my invention for the basic open-hearth process cast-iron and scrap are charged with sufficient quantity of limestone or equivalent quantity of lime to give, when melted, a slag containing from fifty-five to sixty per cent. of alkaline earth. I find about one hundred and fifty kilograms of limestone to one thousand kilograms of metal to be a convenient quantity. Oxid of iron in the usual quantity may also be charged with the metals. The charge is then melted and a sufficient quantity—say one to ten per cent. of the weight of the metal charged—of calcium chlorid is added to the bath. It combines with the lime in the slag, which is allowed to remain quietly in contact with—*i. e.*, floating upon—the metal for a sufficient period, say thirty minutes. Usually a smaller quantity of calcium chlorid is sufficient—say from 0.25 to 1.5 per cent. of the weight of the metal charged. Feeding with oxid of iron and lime or limestone is then begun in order, by boiling, to bring all the metal in contact with the slag, and thus to remove the remaining sulfur during the removal of any other impurities. The slag must continually be kept up to between fifty-five and sixty per cent. of alkaline earth by repeated additions of lime or limestone. The quantity of limestone varies with the composition of the metal used.

When a sample of steel taken from the bath can be bent without breaking, a further addition of (0.25 to 1.0 per cent. on the metals charged) calcium chlorid is made.

The larger the proportion of pig to scrap used and the more silicon, sulfur, and phosphorus that pig contains the more lime must be added, and with the larger weight of slag thus formed the proportion of calcium chlorid must be increased.

The following I have found to be suitable quantities to charge into the furnace before melting when using iron containing three per cent. phosphorus and 0.5 per cent. sulfur: seventy-five sulfury basic pig, twenty-five common scrap; limestone, fifteen per cent. of metals charged; iron oxid, seven per cent. of metals charged, and, after melting, chlorid of calcium two and one-half of metals charged with lime or limestone and oxid of iron, as already described. While this proportion suffices in most cases, the quantity of calcium chlorid or other alkaline earthy halogen salt added should not be less than 1.5 per cent. of the slag formed, a larger proportion, even as much as five per cent. of such halogen salt, may at times be needed, as explained above.

By the above-described process pig containing 0.75 per cent. of sulfur has been converted into steel containing .08 per cent. of sulfur, and using iron with .20 per cent. of sulfur this impurity has been reduced to .018 per cent in the steel.

In applying the process to the basic Bessemer converter it is necessary to insure that an exceedingly basic slag containing from fifty-five to sixty per cent. of alkaline earth is formed in conjunction with the calcium chlorid, which is added either before the beginning of the blow or at a somewhat later period with any necessary addition of lime.

I have not fully satisfied myself of the exact chemical reactions that occur, but believe that the following is correct: When there is only thirty-five to forty per cent. of lime, this lime exists in the slag mainly as a silicate, aluminate, or phosphate of lime while the sulfur is in combination with the iron. If, however, there be fifty-five to sixty per cent. of alkaline earth as lime, there is a quantity of free lime in the slag, and this being much more powerful takes the sulfur from the iron and retains it as long as the lime is thus in excess.

I declare that what I claim is—

1. The process of desulfurizing iron during its conversion into steel, which consists in adding to the molten metal an excess of alkaline earth till the slag has from fifty-five per cent. to sixty per cent. of such earth, and then adding chlorid of calcium, substantially as described.

2. The process of desulfurizing iron during its conversion into steel, which consists in maintaining in the slag from fifty-five to sixty per cent. of alkaline earth, and adding to the molten metal an alkaline earthy halogen salt equal to from 1.5 to five per cent. of the slag formed, substantially as described.

3. The process of desulfurizing iron during its conversion into steel in the open-hearth furnace, which consists in maintaining in the slag from fifty-five to sixty per cent. of alkaline earth, and adding to the molten metal an alkaline earthy chlorid equal to from 1.5 to five per cent. of the slag formed, substantially as described.

4. The process of desulfurizing iron during its conversion into steel, which consists in maintaining in the slag from fifty-five to sixty per cent. of alkaline earth, and adding to the molten metal such materials as will form an alkaline earthy halogen salt equal to from 1.5 to five per cent. of the slag formed, substantially as described.

5. The process of desulfurizing iron during its conversion into steel, which consists in adding to the molten metal an excess of lime till the slag has from fifty-five to sixty per cent. of lime, and adding chlorid of calcium equal to from 1.5 to five per cent. of the slag formed, substantially as described.

In testimony whereof I have signed my name to this specification in the presence of two subscribing witnesses.

E. H. SANITER.

Witnesses:
W. P. THOMPSON,
H. P. SHOOBRIDGE.